May 1, 1928.
O. C. SCHMIDT
1,668,287
CARCASS DEHAIRING AND CLEANING MACHINE
Filed June 24, 1927    3 Sheets-Sheet 1
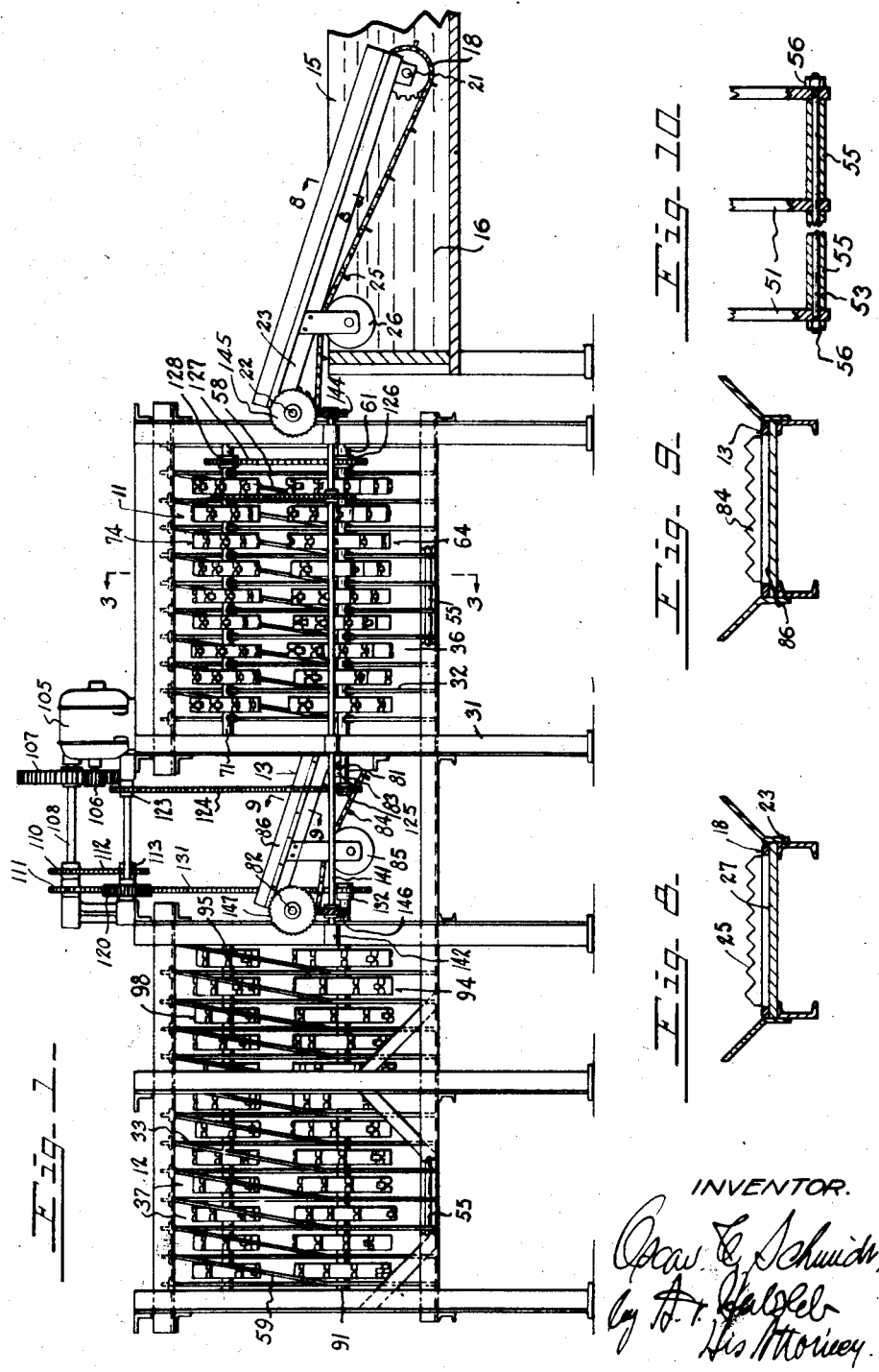
INVENTOR.

May 1, 1928.
O. C. SCHMIDT
1,668,287
CARCASS DEHAIRING AND CLEANING MACHINE
Filed June 24, 1927     3 Sheets-Sheet 2
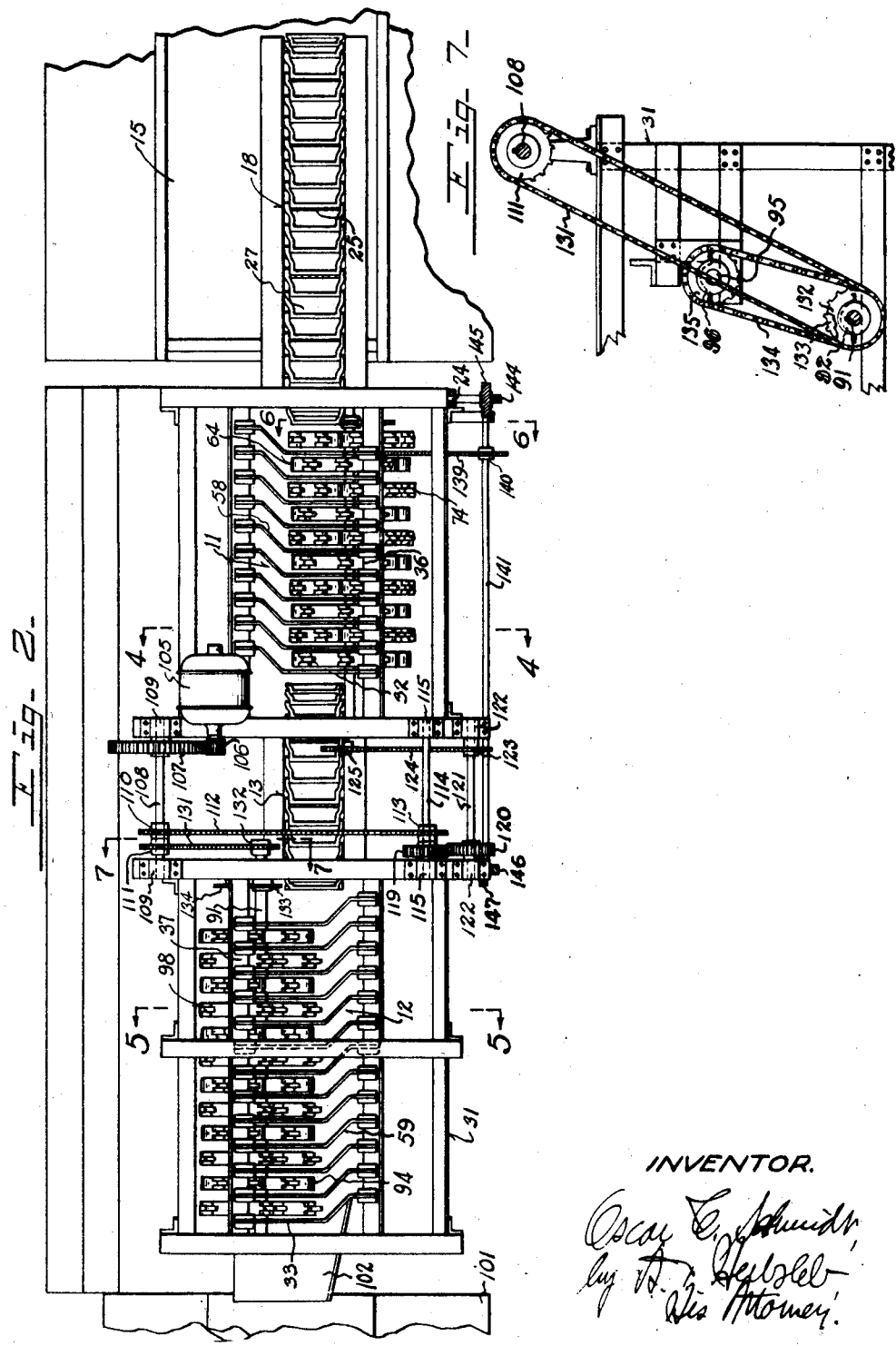
INVENTOR.

May 1, 1928.
O. C. SCHMIDT
1,668,287
CARCASS DEHAIRING AND CLEANING MACHINE
Filed June 24, 1927   3 Sheets-Sheet 3
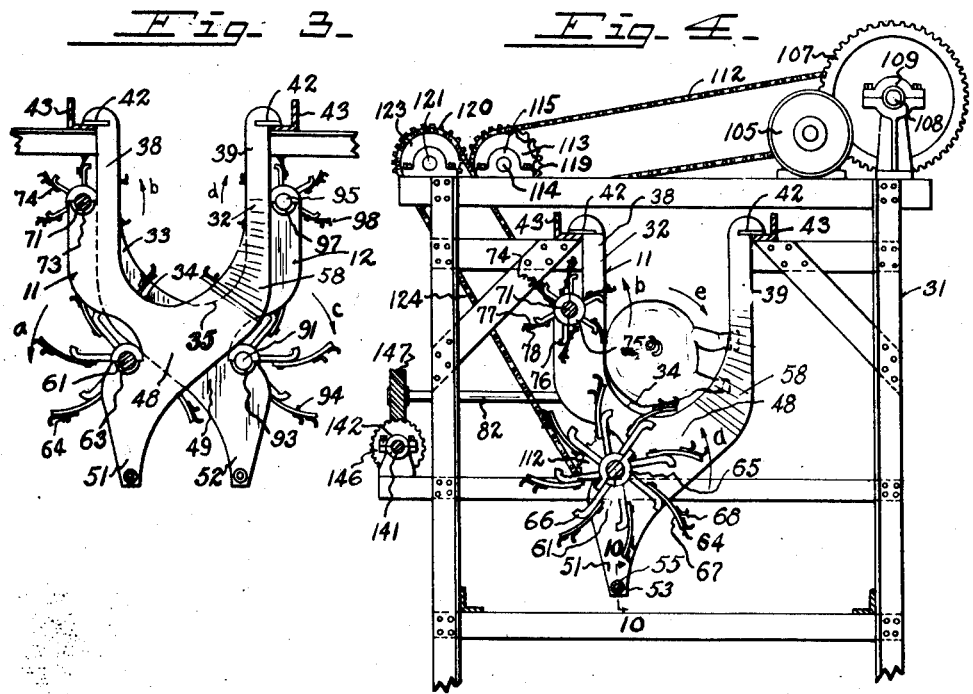
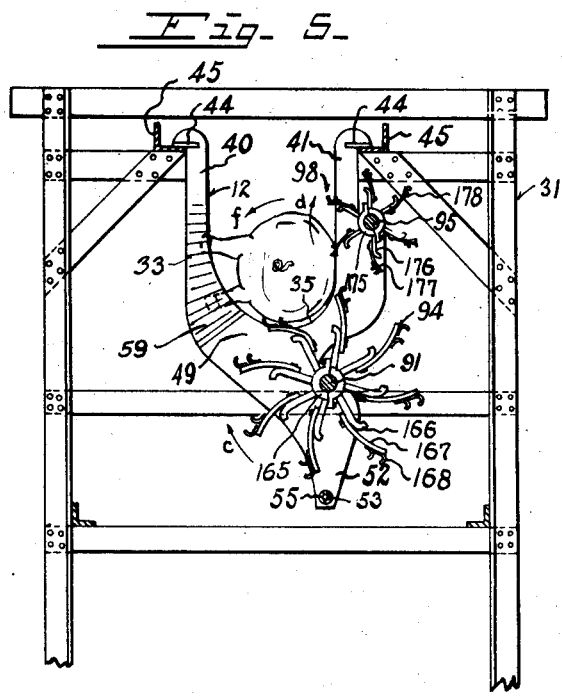
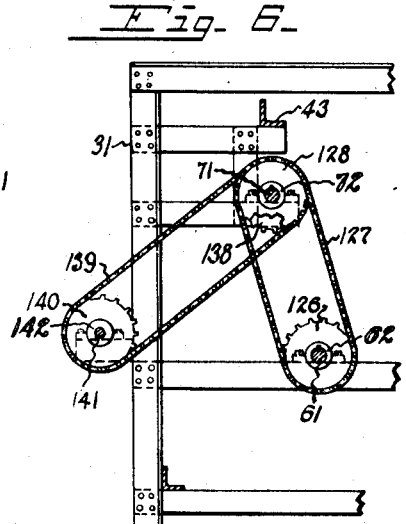
INVENTOR.

Patented May 1, 1928.

1,668,287

UNITED STATES PATENT OFFICE.

OSCAR C. SCHMIDT, OF CINCINNATI, OHIO, ASSIGNOR TO THE CINCINNATI BUTCHERS' SUPPLY COMPANY, OF CINCINNATI, OHIO, A CORPORATION OF OHIO.

CARCASS DEHAIRING AND CLEANING MACHINE.

Application filed June 24, 1927. Serial No. 201,108.

My invention relates to carcass dehairing and cleaning machines employed primarily for dehairing and cleaning hog carcasses, and it is the object of my invention to provide an improved machine in which the carcass is rapidly dehaired and thoroughly cleaned. My invention is an elaboration of and an improvement upon the mechanism shown, described and claimed in Letters Patent of the United States No. 1,388,899, for carcass dehairing and cleaning machine, issued on my application, and dated August 30, 1921.

It is the object of my invention to provide a carcass dehairing and cleaning machine embodying a carcass receiving channel the wall of which has openings through which rotary scraping means act upon the carcass with a raising and dragging effect for rotating the carcass and for moving the carcass against the side wall of the channel and to provide auxiliary rotary scraping means at the same side of the channel, acting on the carcass with an upward and inward dragging effect for aiding in rotating and controlling the carcass; and, further, to so relate the rotary scraping means that lower rotary scraping means reach to a substantial extent laterally under the carcass to draw the carcass above the lower rotary scraping means, and that upper rotary scraping means act upon the side of the carcass thus positioned.

It is the object of my invention, further, to provide a carcass receiving cavity, and scraping means arranged one above the other at one side of the cavity, rotating through openings in the wall of said cavity at said side, the lower scraping means acting upon the carcass for rotating the carcass with a raising and dragging effect against the same side of said cavity, and the upper scraping means acting with a raising and inwardly pressing effect upon the carcass, for aiding in initating rotation and in continuing rotation of the carcass and in providing relief of pressure of the carcass against said side wall of said cavity.

It is the object of my invention, further, to provide a plurality of carcass receiving channels arranged endwise and having walls provided with openings through which rotary scraping means reach into said respective channels, the scraping means of said respective channels rotated in opposite directions for scraping the carcasses first in one direction and then in the opposite direction, for dehairing and cleaning said carcasses while said carcasses are being fed lengthwise in said channels, and, further, to provide endwise conveying means between said channels for feeding the carcasses endwise from the feeding-out end of one carcass receiving channel into the feeding-in end of an adjacent carcass receiving channel.

The invention will be further readily understood from the following description and claims, and from the drawings, in which latter:

Fig. 1 is a side elevation of my improved device, partly broken away.

Fig. 2 is a plan view of the same, partly broken away.

Fig. 3 is an end elevation, partly in section on the line 3—3 of Fig. 1, and partly broken away, showing the relative arrangement of the endwise feeding channels and the scraping means for the respective channels.

Fig. 4 is a vertical cross-section of my improved device, taken on the line 4—4 of Fig. 2, partly broken away.

Fig. 5 is a vertical cross-section of my improved device, taken on the line 5—5 of Fig. 2, partly broken away.

Fig. 6 is a cross-section of the driving mechanism, taken on the line 6—6 of Fig. 2, partly broken away.

Fig. 7 is a vertical section of the driving mechanism, taken on the line 7—7 of Fig. 2, partly broken away.

Fig. 8 is a cross-section of one of the conveyors, taken on the line 8—8 of Fig. 1.

Fig. 9 is a cross-section of the other conveyor, taken on the line 9—9 of Fig. 1; and, Fig. 10 is a detail of the grate, taken in the plane of the line 10—10 of Fig. 4.

There is a plurality of carcass receiving channels 11, 12, hereinafter termed grates, which are arranged endwise with relation to each other, and having an endwise conveyor 13 between adjacent grates, for transferring the carcasses from the feeding-out end of a grate in rear into the feeding-in end of the grate in advance, and so arranged that the hog carcasses are fed endwise through endwise adjacent grates and, during passage therethrough, are acted on by rotary scraping devices for dehairing the carcasses and cleaning the same, the scraping devices of adjacent grates rotating preferably in opposite directions, so that the paths of the scrapers across the carcasses in one grate are in directions opposite to the directions of the paths of the scrapers acting on the carcasses in the adjacent grate.

Referring to the drawings, there is a usual scalding tank 15, containing a body 16 of scalding water of suitable temperature and height, into which the carcasses are placed for scalding and conditioning the same for scraping operations, as is well understood in the art.

A conveyor 18 is an endless traveling link-conveyor, and is arranged to convey the carcasses from the scalding tank to the grate 11. This conveyor is exemplified as received loopwise about suitable pulleys at the respective ends of the loop, mounted on shafts 21, 22, journaled in suitable bearings at the respective ends of the conveyor frame 23. The shaft 22 is journaled in bearings 24 on the machine-frame.

The lower end of the conveyor is received in the scalding tank, and its upper end has attachment with the dehairing machine. The conveyor comprises suitable cleats 25 for aiding in conveying the carcass. The conveyor frame may also have an idler pulley 26 thereon for directing the lower stretch of the endless conveyor. The hogs in the scalding tank are arranged to be floated above the lower end of the conveyor and to be conveyed endwise by the conveyor into the machine. The travelling conveyor operates in the bottom of a conveying trough 27, the sides of which are formed by walls inclined inwardly and downwardly toward the travelling conveyor.

The grates 11, 12, are located in the frame 31 of the machine, and respectively comprise bars 32, 33, having depressions 34, 35, forming cavities or channels for the carcasses. The bars of the respective grates have spaces 36, 37, between them. The bars are shown substantially U-shaped. The bars 32 have upward extensions 38, 39, and the bars 33 have upward extensions 40, 41. The upper ends of the extensions 38, 39, are provided with lugs 42 by means of which they are secured to the longitudinal stringers 43 of the frame, and the upper ends of the extensions 40, 41, are provided with lugs 44 by means of which they are secured to the longitudinal stringers 45. The bars 32, 33, are arranged flatwise in the machine one in advance of the other for forming endwise channels or paths for the carcasses.

The bars 32, 33, are provided with enlargements 48, 49, in the plane of the bars, for widening the bars to form partitions between the spaces which separate the bars, and form compartments in which the legs and other protuberances of the carcass are received during rotation of the carcass, the partitions preventing reception of said legs and protuberances across the outer edges of the bars and avoiding breakage of and injury to such legs and protuberances.

The lower ends of the bars 32 are provided with lower extensions 51, and the lower ends of the bars 33 are provided with lower extensions 52. These extensions of each of the sets of bars are secured to the frame of the machine as by a rod 53, which has spacer tubes 55 on it between adjacent bars, the bars and tubes being clamped together by nuts 56 at the respective ends of the rod.

The bars of the respective grates are rigidly secured together and to the frame, affording free space between the bars throughout their heights in which the scraping devices and legs and protuberances of the carcasses may move.

The bars of the grate 11 are inclined, as at 58, at one side of the carcass depression, the incline being such that, as the hog carcass rotates, its legs and projecting parts of its body are received against the inclined sides of the bars, in the present instance against the upper faces of said inclined sides, the carcass being thereby advanced lengthwise in the depressions in said bars, the path of the carcass in the present instance being lengthwise through the grate.

The bars of the grate 12 are inclined, as at 59, at the other side of the carcass depression, the incline being such that, as the carcass rotates in the opposite direction, its legs and projecting parts of its body are received against the inclined sides of the bars, in the present instance against the upper faces of said inclined sides, the carcass being advanced lengthwise in the depressions in said bars.

Rotation of the carcass in the grate 11 is effected in the present instance by a scraper shaft 61 journaled in bearings 62, on the frame, and received in bearing recesses 63, in the respective bars, and scraping devices 64 fixed to the shafts and rotating in the spaces between the bars. These scraping devices are instanced as including hubs 65 and arms 66 which are rigid therewith, forming so-called stars, which are of cast metal, cast in sections and arranged to be readily clamped about the scraper shaft. Flexible arms 67 are fixed to the arms 66, and have scraper blades 68 thereon, arranged to act on the carcass for removing the hair or bristles from the carcass and cleaning the same.

The scraper shaft 61 has an axis of rotation preferably located lower than the bottom of the depressions in the bars and at one side of said depressions or the path of the carcass through the grate. The scrapers are located in the spaces between the spaced-apart bars of the grate and reach into the grate or path of the carcasses into contact with the carcasses with an upward or outward sweep or motion, as indicated by the arrow *a* in Figs. 3 and 4. The scrapers reach to substantial extent across the path of the carcass in the channel under the carcass.

Such coaction with the carcass has a raising and dragging effect upon the carcass for rotating the carcass and moving the carcass toward the wall at that side of the depression at which the extensions 38 are located. The legs and other projecting portions of the carcass during rotation move downwardly at the slanting sides of said bars and contact the upper surfaces of said slanting sides and thereby urge the carcass endwise.

The advancing motion of the carcasses endwise may also be aided by arranging the scraper arms of successive scrapers angularly or rotatively in advance of each other, for causing the scrapers of successively endwise scraper means to act successively upon the carcass with a screw-like motion for advancing the carcass. If desired, however, the scrapers of the various scraping means may be arranged in alinement.

For aiding in rotating the carcasses, and dehairing and cleaning the same, an auxiliary scraper shaft 71 is provided, journaled in bearings 72, in the frame and supported in open bearing recesses 73 in the bars, and scraping means 74 fixed to said shaft. The scraping means 74 are exemplified as comprising hubs 75 and arms 76 rigid therewith, forming stars formed in sections arranged to be clamped rigidly to the scraper shaft 71. Flexible scraper arms 77 are fixed to the arms of said stars, and have scraper blades 78 secured thereto.

The auxiliary scrapers rotate in the spaces between the bars and reach therethrough into the path of the carcass for contacting the carcass. These scrapers reach into said path laterally, preferably to less extent than the lower scrapers. The upper scrapers contact the side of the carcass with an upward movement, as indicated by the arrow *b*, for aiding in initiating rotation of the carcass and continuing rotation thereof and scrape the carcass in a different path from the path in which the scrapers 52 act on the carcass. They also aid in urging contact between the legs and protuberances of the carcass with the inclined sides of the bars, by pushing the carcass toward said inclined sides, and thereby aid in feeding the carcass lengthwise, and they also aid in relieving friction between the carcass and the sides of the bars toward which the carcass is moved by the lower scrapers.

The lower scrapers move the carcass toward that side of the bars at which the axis of rotation of the scrapers is located, the bars creating friction upon the carcass for retarding rotation of the carcass, and insuring a long scraping path by each of the scraping blades across the carcass by reason of such retardation, the friction causing rotation of the periphery of the carcass at less speed than the speed of rotation of the scraper blades in contact with the carcass, the action of the upper scrapers being to partially relieve such friction and aid in rotation of the carcass, and also to urge scraping action between the scrapers and the limber portions of the carcass, for instance, the head and legs, and causing the scrapers to reach into the creases and cavities in the carcass for dehairing and cleaning the same.

When the carcass emerges from the feeding-out end of the grate 11, it is fed toward the feeding-in end of a grate 12 by means of the conveyor 13. This conveyor is exemplified as an endless traveling link conveyor, received loopwise about pulleys at the respective ends of the loop, mounted on shafts 81, 82, journaled in bearings 83 on the frame. The conveyor comprises cleats 84 for aiding in conveying the carcass. An idler pulley 85 is arranged to support the lower stretch of said loop. The traveling conveyor operates in the bottom of a conveying trough 86, the sides of which are formed by walls inclined inwardly and downwardly toward the traveling conveyor.

The conveyor 13 is exemplified as inclined upwardly from the feed-out end of the grate in rear thereof. It will be understood that the scrapers are rotated at high speed and have considerable centrifugal force imparted thereto for causing the flexible arms of the scrapers to stand out stiffly during rotation and raising the carcass. The end of the carcass first emerging from the feeding-out end of the grate 11, which may be the head of the carcass, after it leaves the support of the rotating scrapers in the grate 11 drops downwardly for being received on the lower end of the conveyor 13. The friction of the conveyor against the emerging carcass draws the carcass endwise with the conveyor. The channel form of the conveyor aids in maintaining the carcass in endwise relation for endwise travel of the carcass.

The conveyor 13 automatically conveys the hog from the grate 11 into the grate 12, and delivers the incoming end of the hog at an elevation above the circular path of the scrapers in the grate 12, for ready entrance of the carcass into said grate 12. The upper scrapers in the grate 12, aid the lower scrapers therein in initiating rotation of the carcass, which rotation is exemplified in a direction reverse to the direction of rotation of the carcass in the grate 11, which the carcass has just left, the inclination of the bars in the grate 12 aiding in feeding the hog endwise into the receiving grate, the upper scrapers aiding in holding the limber hog in endwise position for proper reception in the grate.

Rotation of the carcass in the grate 12 is effected in the present instance by a scraper shaft 91 journaled in bearings 92 on the frame and received in bearing recesses 93 in the respective bars, and scraping devices 94 fixed to the shafts and rotating in the spaces between the bars.

These respective scraping devices are the same as the scraping devices 64, the parts thereof being designated by similar reference numerals raised to the series 100.

The scraper shaft 91 has an axis of rotation preferably located lower than the bottoms of the depressions in the bars 33 and at one side of said depressions or of the path of the carcasses passing through the grate 12. The scraper shaft 91 is shown located at that side of the grate opposite to the side of the grate 11 at which the scraper shaft 61 is located. The scraper shaft 91 is also preferably rotated in a direction, indicated by the arrow c, opposite to the direction in which the scraper shaft 61 is rotated.

The scrapers 94 reach to substantial extent into the path of the carcasses in the channel of the grate 12 and under the carcasses which has a raising and dragging effect upon the carcasses in a direction laterally opposite to the lateral direction of the raising and dragging effect on the carcasses in the grate 11, the carcasses coacting with the upper surfaces of the inclined portions 59 of the bars 33 for feeding the carcasses endwise toward the feeding-out end of the machine.

For aiding in rotating the carcasses in the grate 12 and dehairing and cleaning the same, an auxiliary scraper shaft 95 journaled in bearings 96 in the frame and supported in open bearing recesses 97 in the bars is provided, and scraping means 98, similar in construction to the scraping means 74, secured to the shaft 95, the parts thereof being designated by similar reference numerals raised to the series 100. The scrapers 98 reach into the path of the carcass laterally preferably to less extent than the lower scrapers 94. The upper scrapers 98 rotate in the spaces between the bars in the direction indicated by the arrow d, and into the path of the carcasses and contact the side of the carcasses with an upward movement for aiding in initiating rotation of the respective carcasses and continuing rotation thereof and rotating in a direction opposite to the direction of rotation of the scrapers 74.

The action of the scrapers 94 and 98 respectively upon the carcasses are similar to that of the scrapers 64 and 74, the scrapers 94 and 98, however, rotating in directions opposite to the directions of rotation of the scrapers 64 and 74, and their coaction with the bars and the coaction caused thereby of the carcasses with the bars and with the inclined portions of said bars is the same as the coactions caused by the scrapers 64 and 74, for rotating the carcass in opposite direction and feeding the carcass lengthwise in the same direction. The carcasses in the respective grates rotate in the directions of the arrows e and f.

When the carcass emerges from the feeding-out end of the grate 12, it is received on a gambrelling table 101, preferably through a chute 102 between the end of the grate 12 and said gambrelling table.

Suitable means are provided for rotating the scraping devices and for causing travel of the conveyors. Thus an electric motor 105 is mounted on the top of the machine frame. The rotor of the motor has a pinion 106 fixed to it, this pinion meshing a gear 107 fixed to a shaft 108 journaled in bearings 109 on the top of the machine frame. This shaft has sprocket wheels 110, 111, fixed thereto.

A sprocket chain 112 is received about the sprocket wheel 110 and a sprocket wheel 113 fixed to a shaft 114 journaled in bearings 115 on the top of the other side of the frame. A gear 119 on the shaft 114 meshes with a gear 120 on a shaft 121 journaled in bearings 122 at the top of the machine frame. A sprocket wheel 123 is fixed to the shaft 121. A sprocket chain 124 is received about the sprocket wheel 123 and a sprocket wheel 125 fixed to the scraper shaft 61 for rotating the latter. A sprocket wheel 126 is fixed to said scraper shaft, a sprocket chain 127 being received thereabout and about a sprocket wheel 128 fixed to the scraper shaft 71 for rotating the latter in the same direction as the direction of rotation of the scraper shaft 61.

A sprocket chain 131 is received about the sprocket wheel 111 and about a sprocket wheel 132 fixed to the scraper shaft 91. A sprocket wheel 133 is fixed to the scraper shaft 91. A sprocket chain 134 is received about the sprocket wheel 133 and about a sprocket wheel 135 fixed to the scraper shaft 95 for rotating the latter.

The means for operating the conveyors are exemplified as a sprocket wheel 138 fixed to the scraper shaft 71. A sprocket chain 139 is received about the sprocket wheel 138 and a sprocket wheel 140 fixed to a shaft 141 extending lengthwise of the frame and journaled in bearings 142 on the frame. A spiral gear 144 fixed to the shaft 141 meshes with a spiral gear 145 fixed to the shaft 22 of the conveyor 18. A spiral gear 146 fixed to the shaft 141 meshes with a spiral gear 147 fixed to the shaft 82 of the conveyor 13.

Having thus fully described my invention what I claim as new, and desire to secure by Letters Patent, is:

1. In a machine of the character described, the combination of a grate comprising spaced-apart substantially U-shaped bars forming a carcass-receiving depression the lower portion of which is continuously positioned downwardly, lower rotatable scraping means in the lower parts of the spaces between said bars and having upper portions reaching into said depression and moving outwardly toward one of the sides of said bars and moving the carcass into frictional contact with a portion of said one of said sides, and upper rotary scraping means in said spaces at said one of said sides of said bars and having inner portions reaching sidewardly into the side of said depression and moving upwardly, said upper rotatable scraping means spaced upwardly from said lower rotatable scraping means to expose said portion of said one of said sides of said bars to said frictional contact by the carcass in said depression, and said inner portions of said upper rotatable scraping means contacting the upper side portion of the carcass to relieve said frictional contact.

2. In a machine of the character described, the combination of a grate comprising spaced-apart substantially U-shaped bars forming a carcass-receiving depression the lower portion of which is continuously positioned downwardly, lower rotatable scraping means in the lower parts of the spaces between said bars and having upper portions reaching into said depression and moving outwardly toward one of the sides of said bars and moving the carcass into frictional contact with a portion of said one of said sides, upper rotary scraping means in said spaces at said one of said sides of said bars and having inner portions reaching sidewardly into the side of said depression and moving upwardly, said upper rotatable scraping means spaced upwardly from said lower rotatable scraping means to expose said portion of said one of said sides of said bars to said frictional contact by the carcass in said depression, and said inner portions of said upper rotatable scraping means contacting the upper side portions of the carcass to relieve said frictional contact, and means for feeding the carcass endwise.

3. In a machine of the character described, the combination of a grate comprising spaced-apart substantially U-shaped bars forming a carcass-receiving depression the lower portion of which is continuously positioned downwardly, one of the sides of said bars being inclined for endwise feeding movement of the carcass, lower rotatable scraping means in the lower parts of the spaces between said bars and having upper portions reaching into said depression and moving outwardly toward the other sides of said bars, and moving the carcass into frictional contact with a portion of said other of said sides of said bars, and upper rotary scraping means in said spaces at said other of said sides of said bars and having inner portions reaching laterally into the side of said depression and moving upwardly, said upper rotatable scraping means spaced upwardly from said lower rotatable scraping means to expose a portion of said last-named sides of said bars to said frictional contact by the carcass in said depression, and said inner portions of said upper rotatable scraping means contacting the upper side portion of the carcass to relieve said frictional contact and to tilt said carcass toward said inclined side of said bars for contact of the carcass with said inclined side for endwise feeding movement of the carcass.

4. In a carcass dehairing machine, the combination of a plurality of grates, said grates forming endwise paths for the carcasses, the walls of said paths provided with openings, said grates arranged in endwise relation, scraper shafts for said respective grates, said scraper shafts arranged lengthwise of said paths and provided with scraping means passing said openings into contact with the carcasses in said grates, means for rotating said scraper shafts and said scraping means for said respective grates in opposite directions and thereby rotating and scraping the carcasses in opposite directions in successive ones of said grates while feeding the carcasses endwise along said respective scraping means lengthwise of said respective rotary scraper shafts, and endwise conveying means between proximate ends of endwise adjacent grates for conveying the carcasses endwise between grates.

5. In a carcass dehairing machine, the combination of a plurality of grates provided with lateral openings, said grates forming endwise paths for the carcasses, said grates arranged in endwise relation, oppositely rotating scraper shafts for said respective grates at opposite sides of adjacent grates, said scraper shafts arranged lengthwise of said paths and provided with scraping means passing said openings into contact with the carcasses in said respective grates and arranged to rotate and scrape the carcasses in opposite directions in said respective grates while feeding the carcasses endwise along said respective scraping means lengthwise of said respective rotary scraper shafts, and endwise conveying means between proximate ends of adjacent grates for conveying the carcasses endwise between grates.

6. In a carcass dehairing machine, the combination of a plurality of grates provided with lateral openings, said grates forming endwise paths for the carcasses, said grates arranged in endwise alinement, a pair of scraper shafts arranged one above the other at one side of each of said grates, said pairs of scraper shafts arranged on opposite sides of adjacent grates, said scraper shafts arranged lengthwise of said paths and provided with scraping means passing said openings into contact with the carcasses in said grates from opposite sides of said respective paths of said carcasses, means for rotating the scraper shafts of adjacent grates in opposite directions for rotating and scraping said carcasses in opposite directions in said respective grates while feeding the carcasses endwise along said respective scraping means lengthwise of said respective scraper shafts, and endwise conveying means between proximate ends of adjacent grates for conveying the carcasses endwise between grates.

7. In a carcass dehairing machine, the combination of a plurality of grates, each of said grates comprising spaced-apart bars having carcass receiving depressions forming endwise paths for the carcasses, said grates arranged in spaced-apart relation endwise, said bars of adjacent grates having opposite sides inclined, rotary scraping means passing the spaces between bars into contact with the carcasses in said paths, said scraping means of adjacent grates being at opposite sides of said respective grates from opposite sides of said paths of said carcasses, means rotating said scraping means of adjacent grates in opposite directions for rotating and scraping said carcasses in opposite directions in said respective grates while feeding the carcasses endwise along said respective scraping means lengthwise of said respective scraper shafts, and endwise conveying means for the carcasses in said space between the grates for conveying the carcasses from the grate in rear into the grate in advance.

8. In a carcass dehairing machine, the combination of a plurality of grates, each of said grates comprising spaced-apart bars having carcass receiving depressions forming endwise paths for the carcasses, said grates arranged in endwise relation, said bars of adjacent grates having opposite sides inclined, scraper shafts parallel with said paths located lower than said depressions, scraping means on said shafts in said spaces between said bars reaching into said paths, the scraper shafts of adjacent grates located at opposite sides of said paths, and means for rotating said scraper shafts of adjacent grates in opposite directions for moving said scraping means upwardly into said paths and rotating and scraping the carcasses respectively in opposite directions and moving the carcasses toward opposite sides of said respective grates, and a scraper shaft and scraping means thereon in said spaces and located at said last-named side of said respective grates above each of said first-named shafts, said last-named scraping means coacting with said first-named scraping means on the carcasses, and said spaced-apart bars of each of said grates provided with carcass contacted portions at said last-named side of said respective grates between said first-named scraping means and said second-named scraping means.

9. In a carcass dehairing machine, the combination of a plurality of grates, each of said grates comprising spaced-apart bars having carcass receiving depressions forming endwise paths for the carcasses, said grates arranged in spaced-apart relation endwise, said bars of adjacent grates having opposite sides inclined in the direction of said paths, scraper shafts parallel with said paths located lower than said depressions, scraping means on said shafts in said spaces between said bars reaching into said paths, the scraper shafts of adjacent grates located at opposite sides of said paths, and means for rotating said scraper shafts of adjacent grates in opposite directions for moving said scraping means upwardly into said paths and rotating and scraping the carcasses respectively in opposite directions and moving the carcasses toward opposite sides of said respective grates, a rotary scraper shaft and scraping means thereon in said spaces between bars located at said last-named side of said respective grates above each of said first-named shafts, said last-named scraping means coacting with said first-named scraping means on the carcasses, and said spaced-apart bars of each of said grates provided with carcass contacted portions at said last-named side of said respective grates between said first-named scraping means and said second-named scraping means, and endwise conveying means for the carcasses in said space between the grates for conveying the carcasses from the grate in rear into the grate in advance in one continuous operation for scraping the carcasses in opposite directions to clean the carcasses.

10. In a carcass dehairing machine, the combination of a plurality of grates each comprising spaced-apart bars having depressions forming endwise paths for the carcasses, said grates arranged in endwise alinement, scraper shafts extending lengthwise of said paths, scraping means on said respective shafts, said scraper shafts and scraping means for said respective grates located at opposite sides of said respective grates, means for rotating said scraping means, said scraping means of said respective grates in opposite directions rotating in said spaces between bars and reaching into the lower portions of said paths with a raising and dragging effect upon the carcasses, and an inclined conveyor having its lower end at the feeding-out end of a grate in rear and its higher end at the feeding-in end of a grate in advance for automatically raising the carcasses above the upper portions of the paths of the rotating scraping means in said grate in advance for delivering the carcasses above said last-named scraping means, and arranged for rotating and scraping the carcasses successively in opposite directions and during continuous endwise feeding movements of the carcasses.

In testimony whereof, I have hereunto signed my name.

OSCAR C. SCHMIDT.